Aug. 28, 1934.　　　P. B. CAMP　　　1,971,368
BRAKE ADJUSTER
Filed Dec. 8, 1932　　　3 Sheets-Sheet 1
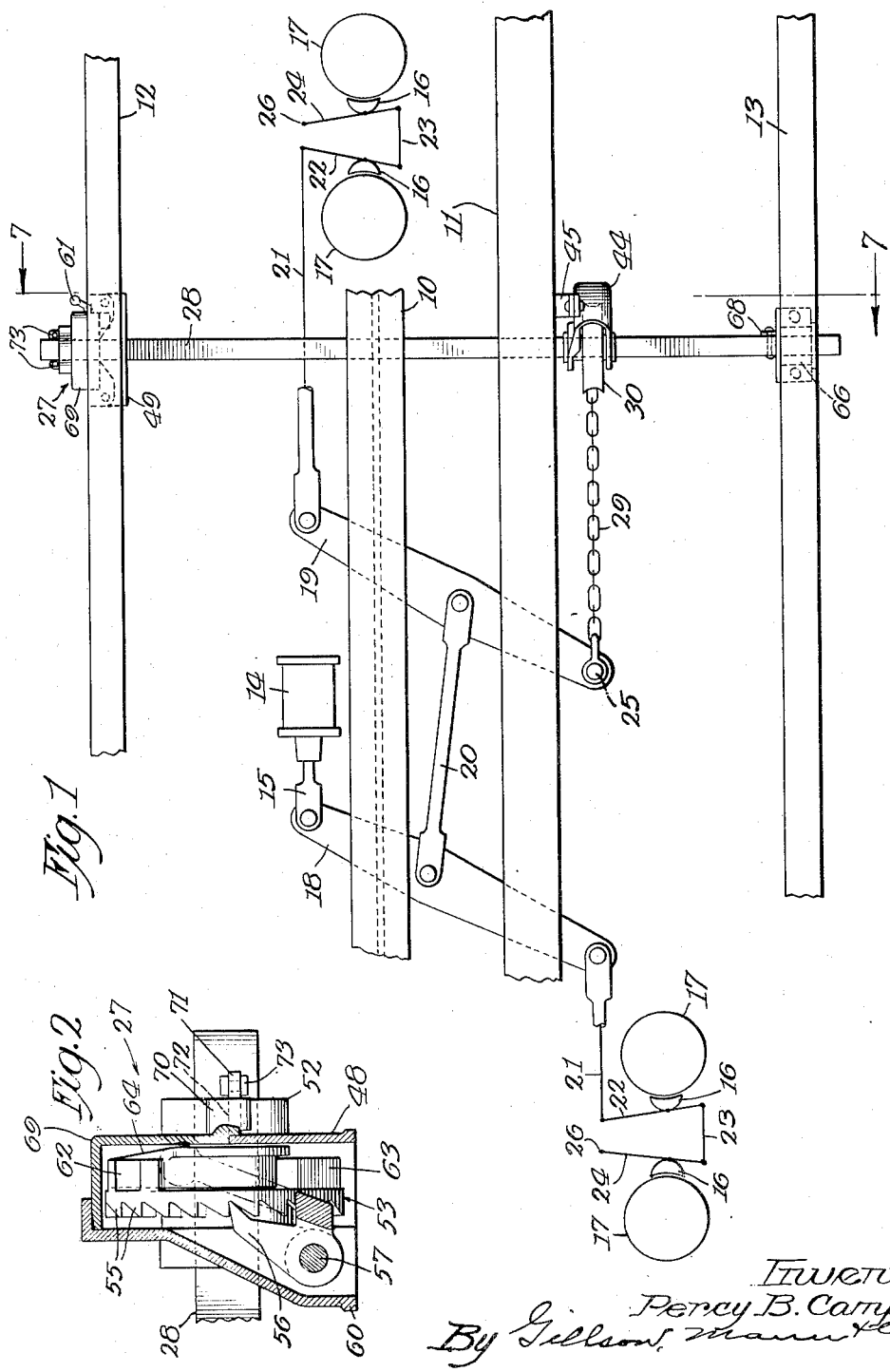
Inventor
Percy B. Camp
By Gillson, Mann & Van Santvoord
Attys.

Aug. 28, 1934.  P. B. CAMP  1,971,368
BRAKE ADJUSTER
Filed Dec. 8, 1932    3 Sheets-Sheet 2
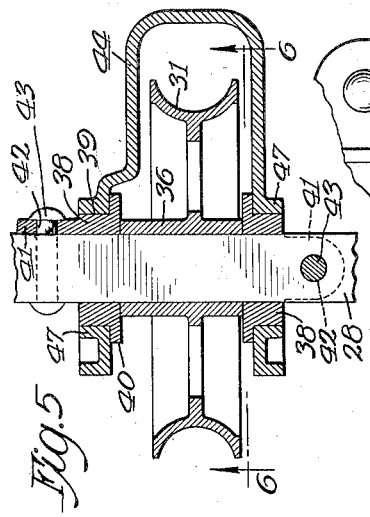
Inventor:
Percy B. Camp
By Gilson, ———— Attys.

Aug. 28, 1934.  P. B. CAMP  1,971,368
BRAKE ADJUSTER
Filed Dec. 8, 1932  3 Sheets-Sheet 3
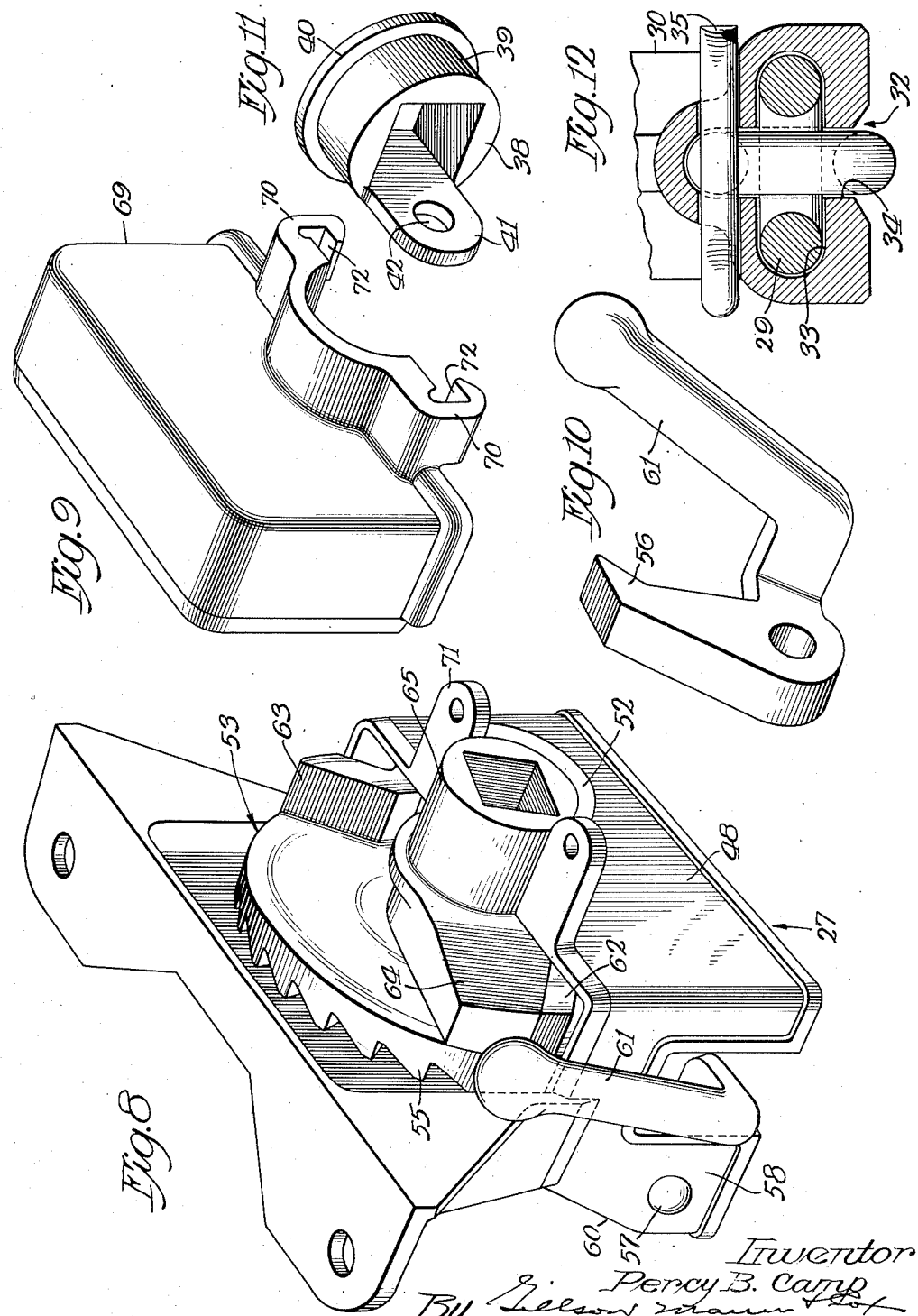

Patented Aug. 28, 1934

1,971,368

UNITED STATES PATENT OFFICE 1,971,368

BRAKE ADJUSTER

Percy B. Camp, Maywood, Ill., assignor to Universal Draft Gear Attachment Co., a corporation of Illinois Application December 8, 1932, Serial No. 646,318

9 Claims. (Cl. 188—197)

This invention relates to brake adjusters for railway cars, and more particularly to a manually operated rotary adjuster which is adapted to be mounted on the car underframe, or some other suitable place, to take up excess slack in the brake gear.

The principal objects of the invention are to provide an adjuster which may be sold as a unit for application to existing cars; which is adapted to use for the operating shaft the standard square stock often employed for brake staffs; which may be operated from either side of the car; which may be readily installed on numerous types of cars; which consists of a minimum number of parts; and which is reliable in operation yet cheap to manufacture.

Further and other objects and advantages will become apparent as the disclosure proceeds and the description is read in conjunction with the accompanying drawings, in which Fig. 1 is a semi-diagrammatic view showing an application of the adjuster to the foundation brake gear of a standard freight car;

Fig. 2 is a sectional view of the adjuster taken on the line 2—2 of Fig. 3;

Fig. 3 is a transverse sectional view of the adjuster taken on the line 3—3 of Fig. 4;

Fig. 4 is a sectional view taken on the line 4—4 of Fig. 3;

Fig. 5 is a sectional view taken on the line 5—5 of Fig. 6 showing the sheave which has a flexible connection with the fulcrum of a dead brake lever;

Fig. 6 is a sectional view taken on the line 6—6 of Fig. 5, part of the sheave being shown in elevation;

Fig. 7 is a transverse sectional view taken on the line 7—7 of Fig. 1 showing the mounting of the adjuster on the car underframe;

Fig. 8 is a perspective view of the adjuster with its cover removed, the parts being shown in the position they assume when the brakes are operated by air;

Fig. 9 is a perspective view of the cover;

Fig. 10 is a perspective view of the holding pawl and release handle;

Fig. 11 is a perspective view of the adapters employed with the sheave for supporting the shaft; and Fig. 12 is a fragmentary, sectional view of the anchoring device on the periphery of the sheave felly, the view being taken on the line 12—12 of Fig. 6.

It will be understood that the specific illustration and description of a preferred form of the invention are for the purpose of disclosure only, and are not to be construed as imposing limitations on the appended claims except as may be required by the prior art.

Referring first to Fig. 1, the reference characters 10 and 11 designate the center sills of a railway car, and 12 and 13 the side sills of the car. A brake cylinder 14 operates through a push rod 15 to actuate the foundation brake gear of the car and apply the brake shoes 16 to the car wheels 17. The brake gear includes the usual live cylinder lever 18, dead cylinder lever 19, tie rod 20, top rods 21, live truck levers 22, intermediate rods 23, and dead truck levers 24.

In the present illustration of this invention, adjustment of the gear is accomplished by shifting the fulcrum 25 of the dead cylinder lever, although it will be understood that the gear may also be adjusted by shifting the fulcrums 26 of the dead truck levers. In the arrangements of foundation brake gear, such for example as used with hopper cars, the adjuster may be applied to any of the fulcrums where adjustment of the gear is customarily made.

In the interest of economy, the adjuster generally designated 27 is designed to be operated by a square shaft 28 which may be cut from the usual stock employed for brake staffs. The invention, obviously, is not limited to the use of a square shaft or any other noncircular shaft, but merely provides a means for employing such stock if desired.

The fulcrum 25 of the dead cylinder lever is connected to the shaft 28 by a chain 29 or other flexible connection and preferably a sheave 30 is provided upon which the chain or other connection may be wound.

The sheave has a concave felly 31 provided at one point in its circumference with an anchoring device 32 (see Fig. 12) which may consist of suitably formed recesses 33 and 34 for receiving adjacent horizontal and vertical links respectively of the chain 29. A pin 35, passed transversely through the sheave, holds the chain in place. It will be understood that the end wall of the recess 33 prevents the horizontal link from moving to the left (Fig. 6) and the pin 35 prevents the vertical link from moving to the right.

The hub 36 of the sheave is preferably square in cross section, as shown in Fig. 6, and is connected to the felly 31 by spokes 37.

Adapters 38 having bearing surfaces 39 are telescopically mounted on the shaft on opposite sides of the sheave, and are provided with flanges 40 against which the hub 70 of the sheave is adapted to bear. The adapters are provided with outwardly extending ears 41 which are apertured at 42 to receive rivets 43 anchoring the adaptors to the shaft. The shaft is supported at this point in its length by a chain guard 44 fastened by brackets 45 and 46 to the center sill 11, and having bearings 47 in which the adaptors 38 are journaled.

The adjuster 27 consists of a box-like housing 48 secured by a bracket 49 to the web 50 of the side sill 12. The housing is provided with alined bearings 51 and 52 through which the shaft 28 is adapted to pass. The housing 48 is preferably open at the bottom as shown in Figs. 3, 4 and 8.

A crown ratchet wheel 53 is provided with a hollow hub 54 adapted to be journalled in the bearing 51. The internal diameter of the hollow hub 54 is greater than the diagonal dimension of the shaft so that the ratchet wheel may rotate in the housing independently of the shaft.

Inclined teeth 55 provided on one face of the ratchet wheel 53 adjacent its periphery cooperate with the pawl 56 to prevent rotation of the wheel in one direction. The pawl 56 is pivoted on a pin 57 which extends between the side walls 58 and 59 of the housing extension 60. A weighted handle 61 preferably integral with the pawl 56 extends laterally and forwardly from the housing to hold the pawl by gravity in engagement with the ratchet teeth.

The other face of the ratchet wheel 53 is provided with lugs 62 and 63 spaced apart a distance corresponding to normal brake shoe clearance. These lugs cooperate with an arm 64 telescopically mounted on the shaft 28, the hub portion 65 of which is journalled in the bearing 52.

It will be observed that the weight of the shaft is supported by the bearing 52 through the intermediary of the hub 65 of the arm 64, the bearing 51 serving only to rotatably support the ratchet wheel 53 and furnishing no support to the shaft.

As shown in Fig. 7, the shaft 28 passes through suitable openings in the center sills 10 and 11, and is supported at one end by the adjuster 27 and at the other end by a bearing 66 secured by a bracket 67 to the side sill 13. An adapter 68 similar to the adapters 38, may be provided for journalling the shaft in the bearing 66.

If, for some reason, it is undesirable to have the adjuster operable from both sides of the car, the shaft may be cut off adjacent the sheave 30, as the sheave itself furnishes a support for the shaft.

The brake gear is adjusted by inserting a rod in the hole 74 at the end of shaft 28 and then rotating the shaft in a clockwise direction (Fig. 3) until the brake shoes 16 are applied to the wheels 17. If the brake gear is in proper adjustment, the arm 64 starting from an initial position adjacent the lug 62 will rotate until it is adjacent to the lug 63, and as the angular distance between the lugs 62 and 63 corresponds to normal brake shoe clearance, the ratchet wheel will not be moved by this operation. If, however, there is excess slack in the gear, the arm 64 will strike the lug 63 and rotate the wheel an amount corresponding to the excess slack in the system.

The pawl 56, which at all times prevents reverse rotation of the ratchet wheel limits the unwinding of the chain 29 to an amount corresponding to normal brake shoe clearance, and consequently whenever the ratchet wheel advances one or more teeth, the fulcrum 25 of the dead cylinder lever 19 occupies a new position upon release of the brakes, correcting the excess slack in the gear.

Whenever an inspector finds that a car has long piston travel, he applies a crank to the shaft 28 and rotates it as far as it will go. It makes no difference whether the inspector returns the adjuster to its normal operative position, or not, as the brake gear is always designed to fall back to release position. The adjuster being operable from either side of the car makes it unnecessary for the inspector to walk along both sides of the train or group of cars, or cross between the cars.

The adjuster housing 48 is preferably provided with a removable cover 69 to permit inspection of the parts. The cover includes the upper half of the bearing 52 and is provided with laterally extending ears 70 having inner horizontal grooves 72 adapted to receive the lugs 71 of the housing. The cover is slipped into position by placing it on the shaft to the right of the adjuster (Fig. 2) and then moving it to the left so as to cause the lugs 71 to enter the grooves 72. A bolt or cotter such as shown at 73 may then be inserted through apertures provided in the lugs 71 to hold the cover in place.

When new brake shoes are to be inserted, it becomes necessary to move the fulcrum of the dead cylinder lever 19 to the left to accommodate the new shoes, and this is accomplished by releasing the pawl 56 by moving the handle 61 inwardly (Fig. 7). The shaft can then be rotated to any desired position of brake release and after the new shoes have been inserted, it is only necessary to wind the shaft in the opposite direction as far as it will go to secure proper brake adjustment, the adjuster limiting the unwinding of the chain 29 by an amount corresponding to normal brake shoe clearance.

If a round shaft is employed to operate the adjuster, it is obvious that no adapters, such as 38 and 68, are necessary. However, the relatively high cost of cutting suitable keyways in a round shaft makes the use of a square shaft more desirable.

If the shaft 28 is cut off adjacent the sheave 30, as previously mentioned, it is desirable to omit the rivet 43 in the ear 41 of the inside adapter 38 as it is unnecessary and weakens the shaft.

It will be understood that the invention is susceptible of many modifications, the only essential being that the arm 64 moves with the shaft, while the ratchet wheel 33 moves independently of the shaft. Consequently, the use of the term "fixed" in the appended claims to designate the connection between the arm 64 and the shaft is intended to mean that the arm moves with the shaft as it is rotated, but is not necessarily rigidly secured to the shaft.

What I claim, therefore, is:

1. Mechanism for adjusting the foundation brake gear of a railway car, comprising a shaft, a sheave mounted on the shaft, a flexible connection between the sheave and a dead brake lever of the gear, a winding device at one end of the shaft, said device comprising an arm fixed on the shaft, a ratchet wheel provided with inclined teeth on one of its side faces adjacent its periphery, lugs on the other face spaced apart a distance corresponding to normal brake shoe clearance, a pivoted pawl engageable with the ratchet teeth to prevent rotation of the ratchet wheel in one direction, a counterweight on the pawl urging the pawl into engagement with the teeth, said arm and lugs cooperating so that when there is excess slack in the brake gear, rotation of the shaft in a direction to apply the brakes will cause the arm to engage one of the lugs and advance the ratchet wheel an amount corresponding to excess slack whereupon the gear is adjusted.

2. In a brake system for railway cars including a live cylinder lever receiving power at one end from a brake cylinder push rod, and a dead cylinder lever connected to the live cylinder lever by a tie rod, the combination of manual means associated with the fulcrum of said dead cylinder lever for regulating the system and comprising a horizontal shaft rotatably mounted on the car underframe and extending transversely of the car body, a connection between the dead cylinder lever fulcrum and the shaft whereby rotation of the shaft moves the fulcrum in a direction to apply the brakes, a ratchet wheel loosely mounted on the shaft having inclined teeth on one of its side faces adjacent its periphery, an arm on the shaft adapted to pick up and rotate the ratchet wheel if the shaft is turned an amount greater than normal brake shoe clearance, and a pawl for holding he ratchet wheel in adjusted position.

3. In a brake system for railway cars including a live cylinder lever receiving power at one end from a brake cylinder push rod, and a dead cylinder lever connected to the live cylinder lever by a tie rod, the combination of manual means associated with the fulcrum of said dead cylinder lever for regulating the system and comprising a horizontal shaft rotatably mounted on the car underframe and extending transversely of the car body, a sheave mounted on the shaft, a flexible connection between the dead cylinder lever and the sheave adapted to be wound around the sheave to move the fulcrum in a direction to apply the brakes, and pawl and ratchet mechanism adapted to limit unwinding of the flexible member to a predetermined amount after the shaft has been rotated in a forward direction to apply the brakes, said mechanism including a crown ratchet wheel, and a gravity pawl having a counterweight urging the pawl into engagement with the wheel, said counterweight being accessible from the side of the car for releasing the pawl when new brake shoes are applied.

4. In a brake adjuster, a rotatable shaft, a ratchet wheel loosely mounted with respect to the shaft and having inclined teeth on one of its side faces adjacent the periphery of the wheel, lugs on the wheel spaced apart a distance corresponding to normal brake shoe clearance, an arm fixed to the shaft cooperating with one of the lugs to advance the wheel if the shaft is rotated in excess of normal brake shoe clearance, a housing for the wheel and arm having an opening for the shaft, and a pawl pivoted on the housing adapted to engage the teeth of the ratchet wheel and limit reverse movement.

5. In a brake adjuster, a box-like housing having alined bearings in opposite side walls, ratchet mechanism including a ratchet wheel having a projecting hollow hub supported by one of the bearings, a shaft extending through the bearing openings and the hollow hub of the ratchet wheel, an arm telescopically mounted on the shaft for rotation therewith and having a hub adapted to seat in the other bearing, said arm and ratchet mechanism cooperating to limit reverse rotation of the shaft.

6. In a brake adjuster, a box-like housing having alined bearings in opposite side walls, ratchet mechanism including a ratchet wheel having a projecting hollow hub supported by one of the bearings, a shaft extending through the bearing openings and the hollow hub of the ratchet wheel, an arm telescopically mounted on the shaft for rotation therewith and having a hub adapted to seat in the other bearing, said shaft being freely rotatable in the hollow hub of the ratchet wheel so that the entire weight of the shaft is carried by the last named bearing, and means associated with the ratchet mechanism and cooperating with the arm to limit reverse rotation of the shaft.

7. In a brake adjuster, a box-like housing having alined bearings in opposite side walls, a ratchet mechanism including a ratchet wheel having a projecting hollow hub supported by one of the bearings, a non-circular shaft extending through the bearing openings and the hollow hub of the ratchet wheel, an arm telescopically mounted on the shaft for rotation therewith and having a hub adapted to seat in the other bearing, said shaft being freely rotatable in the hollow hub of the ratchet wheel so that the weight of the shaft is carried by the last named bearing, and shoulders on the ratchet wheel cooperating with the arm to limit reverse rotation of the shaft to an amount corresponding to normal brake shoe clearance.

8. In a brake adjuster, a box-like housing having alined bearings in opposite side walls, a ratchet wheel having a projecting hollow hub supported by one of the bearings, a shaft extending through the bearing openings and the hollow hub of the ratchet wheel, an arm telescopically mounted on the shaft for rotation therewith and having a hub adapted to seat in the other bearing, a pawl carried by the housing engageable with the ratchet wheel to prevent reverse rotation of the wheel, said arm and ratchet wheel being capable of relative rotational movement by an amount corresponding to normal brake shoe clearance.

9. In a brake adjuster, a box-like housing having alined bearings in opposite side walls, a ratchet wheel having a projecting hollow hub supported by one of the bearings, a shaft extending through the bearing openings and the hollow hub of the ratchet wheel, an arm telescopically mounted on the shaft for rotation therewith and having a hub adapted to seat in the other bearing, a pawl pivotally mounted on the inside of the housing and cooperating with the ratchet wheel to prevent rotation of the ratchet wheel in one direction, and means on the exterior of the housing for releasing the pawl for the insertion of new brake shoes.

PERCY B. CAMP.